United States Patent

Nose et al.

[11] Patent Number: 5,966,167
[45] Date of Patent: Oct. 12, 1999

[54] STEREOSCOPIC DISPLAY APPARATUS

[75] Inventors: Hiroyasu Nose, Zama; Tsutomu Osaka, Kawasaki, both of Japan

[73] Assignee: Canon Kabushiki Kaisha, Tokyo, Japan

[21] Appl. No.: 08/950,048

[22] Filed: Oct. 14, 1997

Related U.S. Application Data

[63] Continuation of application No. 08/443,269, May 17, 1995, abandoned.

[30] Foreign Application Priority Data

May 20, 1994 [JP] Japan .................................. 6-106661

[51] Int. Cl.$^6$ ........................... H04N 13/04; H04N 15/00
[52] U.S. Cl. ............................... 348/59; 348/54; 348/169
[58] Field of Search ................................ 348/42, 51, 52, 348/54, 59, 169; 345/7, 121; 359/466; H04N 9/47, 13/04, 15/00

[56] References Cited

U.S. PATENT DOCUMENTS

| | | | |
|---|---|---|---|
| 4,740,836 | 4/1988 | Craig | 348/49 |
| 4,823,156 | 4/1989 | Shrader et al. | 354/115 |
| 4,950,069 | 8/1990 | Hutchinson | 351/210 |
| 4,987,487 | 1/1991 | Ichinose et al. | 348/59 |
| 5,349,379 | 9/1994 | Eichenlaub | 348/59 |

FOREIGN PATENT DOCUMENTS

| | | | |
|---|---|---|---|
| 401107247 | 4/1989 | Japan | G03B 35/24 |
| 244995 | 2/1990 | Japan . | |
| 250145 | 2/1990 | Japan . | |
| 404122922 | 4/1992 | Japan | G03B 35/24 |
| 5142500 | 6/1993 | Japan . | |

*Primary Examiner*—Michael Lee
*Attorney, Agent, or Firm*—Fitzpatrick, Cella, Harper & Scinto

[57] ABSTRACT

A display apparatus has a display for displaying images for the right and left eyes, a lenticular lens arranged on the front surface of the display, and a detector for detecting the position of the head portion of an observer. A controller controls the images for the right and left eyes, so that the images are equally incident on the two eyes of the observer at the position detected by the position detector.

8 Claims, 8 Drawing Sheets

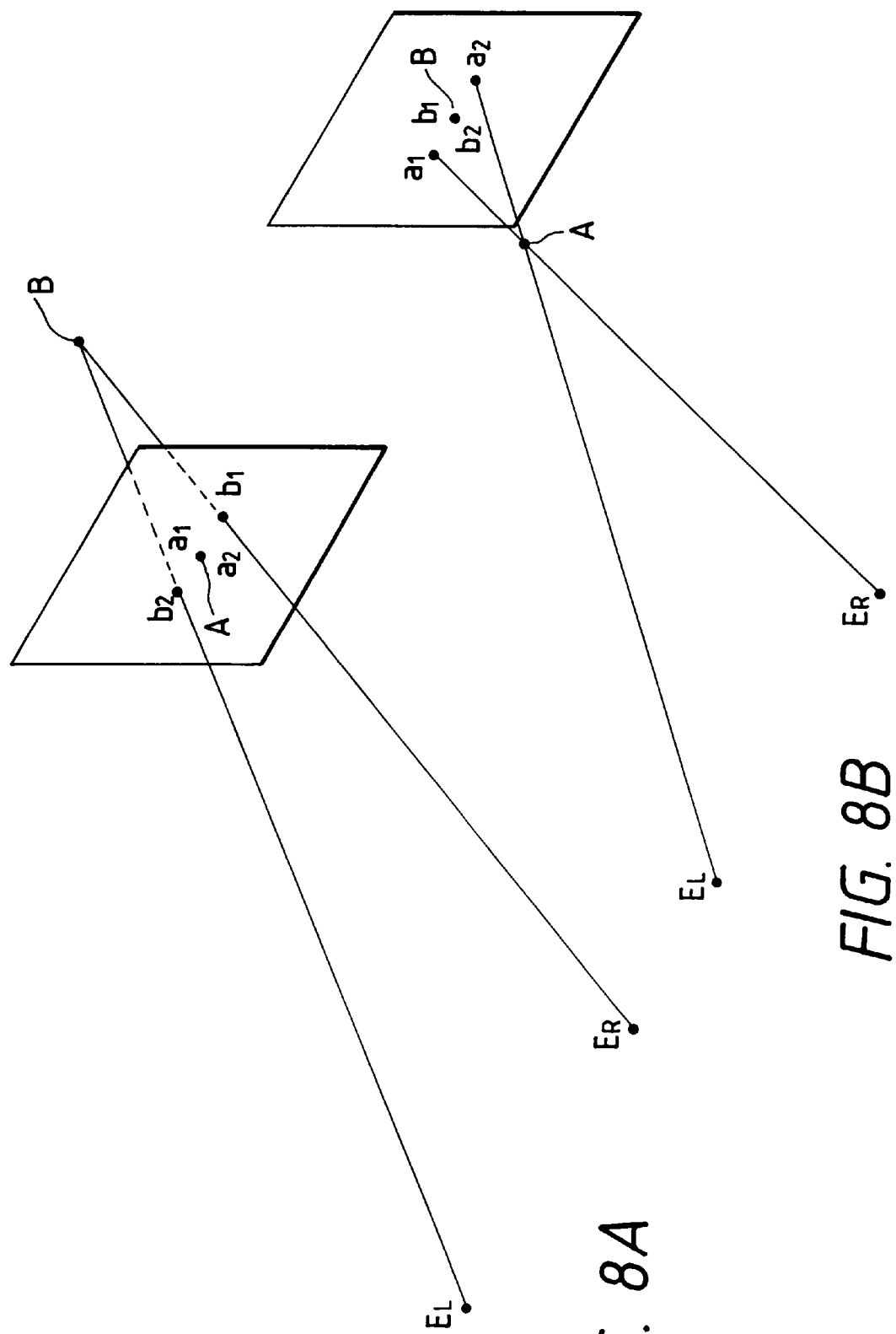

STEREOSCOPIC DISPLAY APPARATUS

This application is a continuation of application Ser. No. 08/443,269, filed May 17, 1995, now abandoned.

BACKGROUND OF THE INVENTION

1. Field of the Invention

The present invention relates to a stereoscopic display apparatus for performing a stereoscopic display on a television system, computer monitor, game machine, and the like, and a screen control method in the apparatus.

2. Related Background Art

As a conventional stereoscopic display method, a method in which images for the right and left eyes are set in different polarization states, and the right and left images are separated using polarization spectacles is known. In order to set different polarization states in this method, a liquid crystal shutter is provided to a display, and the polarization state is switched in synchronism with the field signal of an image displayed on the display, so that an observer who wears the polarization spectacles can watch a stereoscopic view by time-divisional separation of the right and left images for the respective eyes. However, in this method, the observer must always wear the polarization spectacles.

In contrast to this, as a stereoscopic display method which does not use any polarization spectacles, a method in which a lenticular lens is arranged on the front surface of the display, and images to be input to the right and left eyes are spatially separated is known. FIG. 11 is an explanatory view of the conventional method using a lenticular lens. A liquid crystal display 1 comprises a liquid crystal display pixel portion 3 formed between glass substrates 2 and 4. A lenticular lens 5 is arranged on the surface of the liquid crystal display 1. The lenticular lens 5 is constituted by cylindrical lenses each of which has a semi-circular section and extends in a direction perpendicular to the plane of the drawing of FIG. 11. The liquid crystal display pixel portion 3 is located on the focal plane of the lenticular lens 5.

As shown in FIG. 11, pairs of stripe image portions for the right eye (black portions) and the left eye (white portions), each pair of which corresponds to one pitch of the lenticular lens, are alternately arranged on the display pixel portion 3. These stripe image portions are optically separated and imaged by the lenticular lens 5 on right and left eyes $E_R$ and $E_L$ of an observer, thus allowing a stereoscopic view. FIG. 11 illustrates spatial areas, where the images for the right and left eyes can be observed, at the two ends and the central portion of the display. A common area where the eyes (the distance between the centers of the two eyes is e) of the observer can observe the separated right and left images over the entire screen corresponds to a stereoscopic view area 6 indicated by bold lines in FIG. 11. Furthermore, in areas (not shown) adjacent to the stereoscopic view area 6, the observer can stereoscopically observe separated right and left images.

However, the width of the stereoscopic view area is small, and the stereoscopic view range for the observer has a width as small as the distance between the centers of the two eyes, i.e., about 65 mm. For this reason, the observer must fix his or her head position during observation, resulting in uncomfortable observation.

In order to solve this problem, Japanese Laid-Open Patent Application No. 2-44995 has proposed a method of widening the stereoscopic view area by detecting the positions of the two eyes of an observer, and performing movement control of the relative position between a lenticular lens, which is movably supported in the horizontal direction, and display elements on the basis of the detected eye positions. On the other hand, Japanese Laid-Open Patent Application No. 2-50145 has proposed a method of widening the stereoscopic view area by detecting the positions of the two eyes of an observer, and replacing the horizontal positions of display pixel portions of images for the right and left eyes corresponding to the lenticular lens on the basis of the detection signals.

However, in the method of performing movement control of the relative position between the lenticular lens and the display elements, the lenticular lens must be translated without being inclined, while maintaining the focal length to the display elements. In this case, the thin lenticular lens plate is deformed, and it is difficult to maintain an equal distance to the display elements, thus deteriorating an image. Also, high-precision drive and guide/support mechanisms are required, resulting in an expensive apparatus. On the other hand, in the method of replacing the horizontal display positions of images for the right and left eyes, since a black stripe is present between two adjacent display elements, when the two eyes of an observer are just located at the switching positions, the observer undesirably observes the black stripe, resulting in a discontinuous observation. Also, when the switching timing is shifted even slightly, the right and left images are reversed, thus disturbing a stereoscopic view.

In general, in the above-mentioned display method using a lenticular lens, images picked up by stereoscopic cameras or VTRs are directly displayed as images for the right and left eyes to be displayed, and object images in the two images have a predetermined parallax amount on the screen depending on their distances from the cameras. Upon observation, an observer recognizes the depth of an image depending on the parallax amount of object images in the images for the right and left eyes. In this case, when the parallax amount of the object images is larger than the distance which allows the observer to observe the object images as a single image, the object image is doubled, resulting in a difficult observation.

SUMMARY OF THE INVENTION

It is an object of the present invention to provide a stereoscopic display apparatus free from the conventional problems. It is another object of the present invention to provide an image control method free from the conventional problems.

In the method disclosed in Japanese Laid-Open Patent Application No. 2-44995, since the lenticular lens is translated with respect to the display elements, the lens may be undesirably deformed or damaged. In addition, since high-precision drive and guide/support mechanisms are required, the apparatus may become undesirably complicated and its cost may undesirably increase. On the other hand, in the method disclosed in Japanese Laid-Open Patent Application No. 2-50145, the stereoscopic view area is widened by replacing the horizontal display positions of images for the right and left eyes. However, this method suffers problems such as difficult control of the switching timings, appearance of black stripes between pixels upon switching, and the like, and is hard to be realized as an actual product. In order to solve the above-mentioned problems and to widen the stereoscopic view area, the angle of a display is controlled, so that the entire display always faces forward with respect to an observer, or a variable apex angle prism is arranged between the display and an observer to optically change the angle of the display.

As another display method for a stereoscopic display, in order to eliminate fatigue as much as possible and to provide a natural stereoscopic view, for example, the visual axis position of an observer may be detected, and the right and left images may move, so that object images at the visual axis position coincide with each other on the screen.

The present invention has been achieved based on the above-mentioned principle.

More specifically, a stereoscopic display apparatus according to the present invention, which uses a lenticular lens on the front surface of an image display portion, comprises a rotary support mechanism for supporting the stereoscopic display, so that the longitudinal direction of each cylindrical lens of the lenticular lens serves as a rotational axis, drive means for pivoting the stereoscopic display about the rotational axis, detection means for detecting the position of a head portion or the central position between the two eyes of an observer, and control means for controlling the angle of the stereoscopic display on the basis of the detected position of the head portion or the detected central position between the two eyes of the observer.

Another stereoscopic display apparatus according to the present invention, which uses a lenticular lens on the front surface of an image display portion, comprises a variable apex angle prism arranged on the front surface of the lenticular lens, drive means for changing the apex angle of the variable apex angle prism, means for detecting the position of a head portion or the central position between the two eyes of an observer, and control means for controlling the apex angle of the variable apex angle prism on the basis of the detected position of the head portion or the detected central positions between the two eyes of the observer.

There are also provided an image control apparatus which comprises means for detecting the visual axis position, on a stereoscopic display, of an observer, and controls the positions of objects to be observed in images for the right and left eyes to coincide with each other on the display, and an image control method.

According to the present invention, the position of a head portion or the central position between the two eyes of an observer is detected, and the rotation angle of the display is controlled based on the detection signal, thereby naturally and continuously widening the stereoscopic view area. Also, since the visual axis position of an observer is detected, and object images, at the visual axis position, in right and left images are controlled to coincide with each other at the detected position, an object image at the visual axis position can be clearly observed.

BRIEF DESCRIPTION OF THE DRAWINGS

FIGS. 8A and 8B are views for explaining replacement of the positions of images for the right and left eyes in a stereoscopic view;

DETAILED DESCRIPTION OF THE PREFERRED EMBODIMENTS

Figure 1:
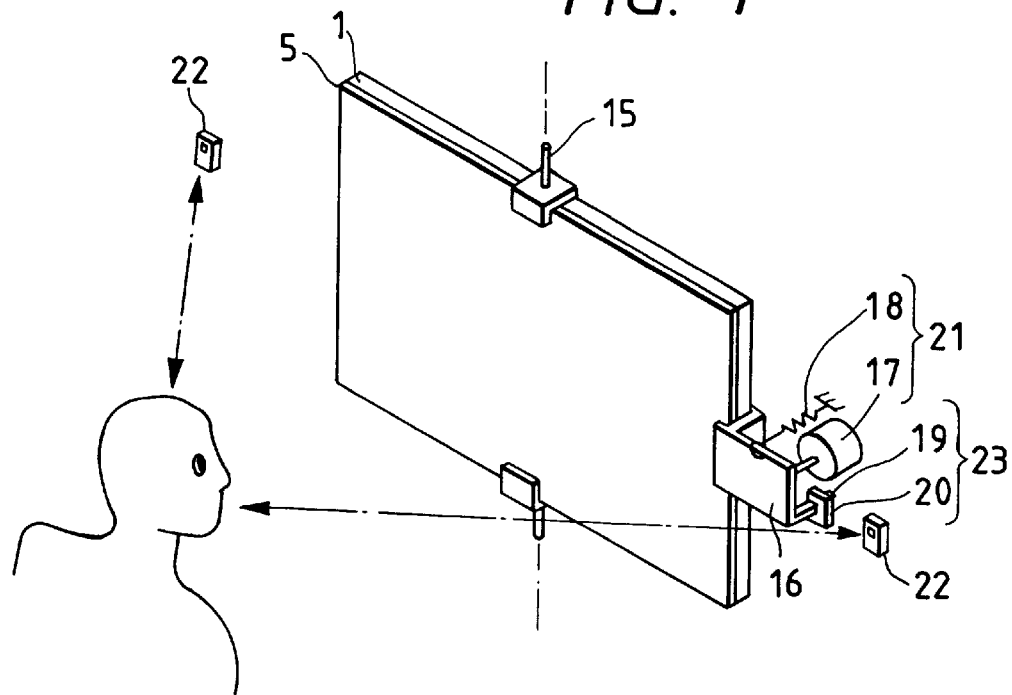
FIG. 1 is a schematic perspective view showing the arrangement of a stereoscopic display apparatus according to the first embodiment of the present invention.
Figure 2:
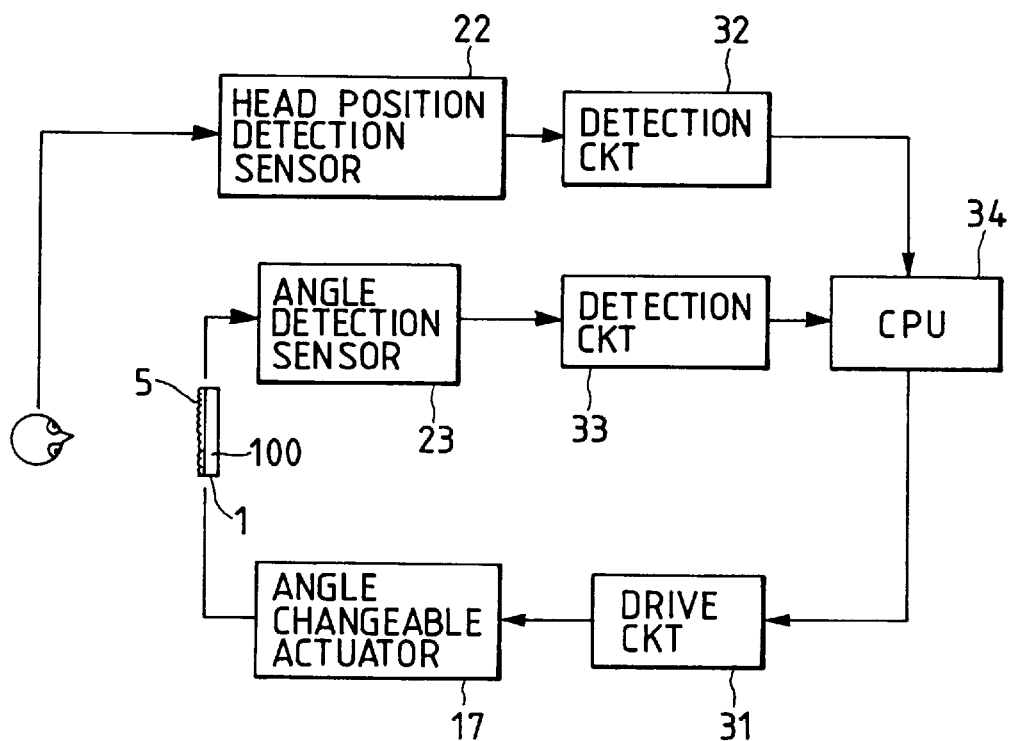
FIG. 2 is a block diagram showing the arrangement of a control system of the apparatus shown in FIG. 1.
Figure 3:
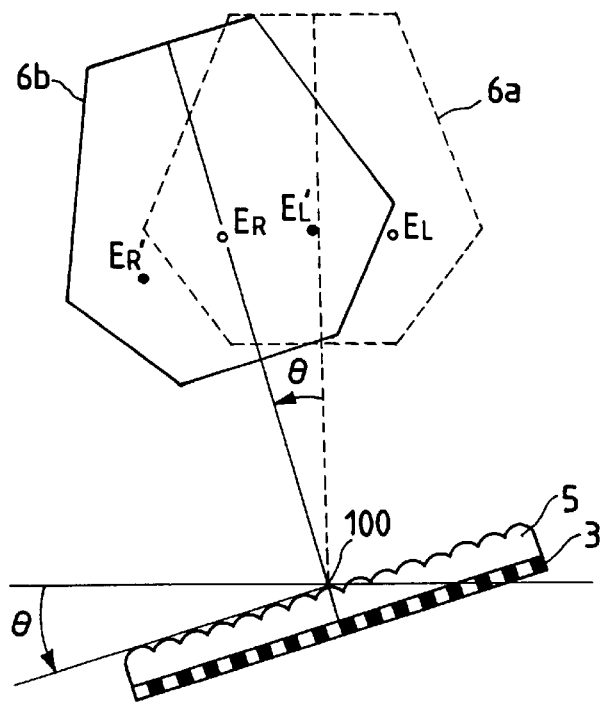
FIG. 3 is a view for explaining a method of widening the stereoscopic view area in the apparatus shown in FIG. 1.

FIGS. 1, 2, and 3 are explanatory views of the first embodiment of the present invention, and the first embodiment will be explained below with reference to these drawings. FIG. 3 is an explanatory view of the principle of the first embodiment of the present invention. FIG. 3 illustrates a display pixel portion 3 of display elements of, e.g., a liquid crystal display, plasma display, fluorescent display tube, CRT, or the like, although it does not illustrate a glass substrate such as a faceplate. A lenticular lens 5 consisting of a transparent resin such as an acrylic resin or glass is arranged on the front surface of the display pixel portion 3, and cylindrical surfaces extend in a direction perpendicular to the plane of the drawing of FIG. 3. As has been described in the prior art, an image on the display pixel portion 3 is optically separated by the lenticular lens 5, so that an image for the right eye (black portions of a displayed image) and an image for the left eye (white portions of the displayed image) are incident on the right and left eyes of an observer. A stereoscopic display constituted by the lenticular lens 5 and the display pixel portion 3 is rotatably supported at its central portion by a rotation axis 100, in the longitudinal direction, of each cylindrical lens of the lenticular lens, and its angle can be changed, as shown in FIG. 3.

FIG. 3 illustrates the positions of right and left eyes $E_R$ and $E_L$, and a stereoscopic view area 6a when an observer is located at the reference position on the central line of the stereoscopic display. When the observer moves from the reference position, and his or her right and left eyes are located at positions $E_R'$ and $E_L'$, as shown in FIG. 3, the stereoscopic display is rotated through an angle θ to follow the shift, thereby setting a stereoscopic view area 6b. For example, when the reference position of the observer is separated from the display by about 50 cm, if it is assumed that the rotation angle θ can follow the observer within a range of ±50, the stereoscopic view area 6a horizontally moves by about ±44 mm. Thus, the stereoscopic view area of the observer falls within a range of ±32.5 mm (the standard distance between the two eyes is assumed to be 65 mm) on the right and left sides of the central reference position when the stereoscopic display is fixed in position and does not follow the movement of the observer, but can be set to be twice or more, i.e., ±78.5 mm by changing the angle of the display to follow the movement of the observer.

FIG. 1 is an explanatory view of the detailed arrangement of the apparatus according to this embodiment. A liquid crystal display 1 provided with the lenticular lens 5 is pivotal about a rotation shaft 15 which is supported by bearings (not shown), and a rotation drive mechanism 21 is arranged on an end portion member 16 of the liquid crystal display 1. The rotation drive mechanism 21 comprises a linear actuator 17 using an electromagnetic coil, and a restoration spring 18 for pressing the member 16 against the linear actuator. An angle detection sensor 23 comprises an encoder scale 19 arranged on a portion of the member 16, and a photosensor 20. Head position detection sensors 22 comprise ultrasonic sensors. The sensors 22 are arranged on the right and left sides of the display, and respectively detect the distances to the head portion of an observer on the basis of the reflection times of ultrasonic waves. A detection circuit (not shown) calculates the horizontal position, parallel to the display, of the head portion of the observer.

FIG. 2 is a block diagram showing the arrangement of a control system of the apparatus of this embodiment. A CPU 34 reads the head position of the observer, which is detected by the head position detection sensors 22 and a detection circuit 32, and calculates a target angle at which the liquid crystal display points toward the observer, on the basis of the read signal. At the same time, the CPU 34 reads the current angle of the liquid crystal display via the angle detection sensor 23 and a detection circuit 33, compares the current angle with the target angle, and controls a drive circuit 31 to drive the angle changeable actuator 17, so that the difference between the two angles becomes 0. With this control, the observer can always be located at substantially the center of the stereoscopic view area within the moving range of the liquid crystal display, thus widening the stereoscopic view area. In this embodiment, the head position detection sensors comprise ultrasonic sensors, but may comprise distance sensors using infrared rays. Alternatively, an image of the head portion of the observer may be picked up using a video camera, and the picked-up image may be subjected to image processing to obtain the head position or the positions of the two eyes.

In this embodiment, the rotation of the liquid crystal display is directly controlled. However, the rotation of the entire unit assembled as a monitor may be controlled to provide the same effect.

Figure 4:
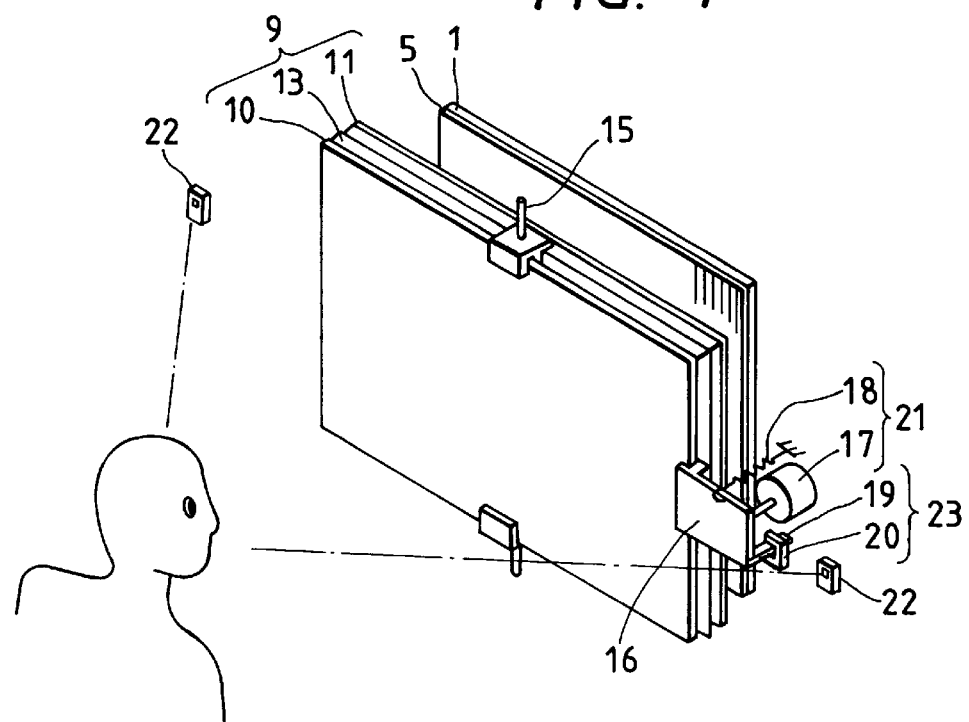
FIG. 4 is a schematic perspective view showing the arrangement of a stereoscopic display apparatus according to the second embodiment of the present invention.
Figure 5:
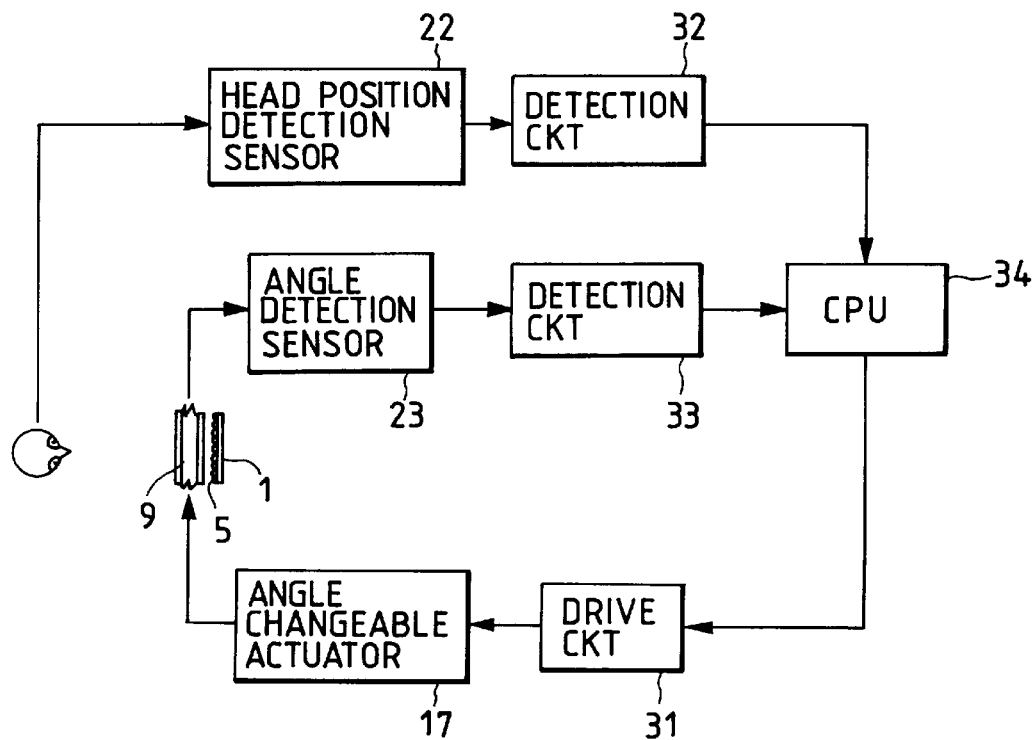
FIG. 5 is a block diagram showing the arrangement of a control system of the apparatus shown in FIG. 4.
Figure 6:
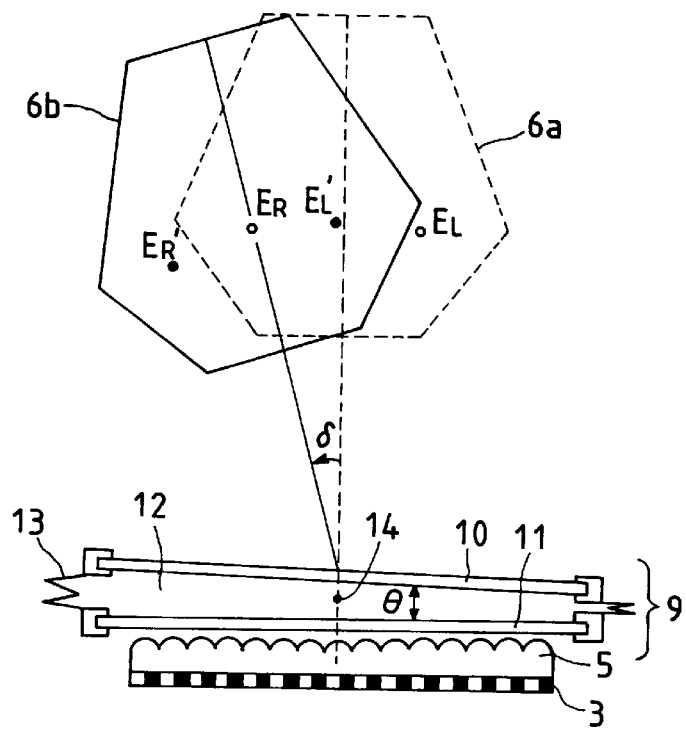
FIG. 6 is a view for explaining a method of widening the stereoscopic view area in the apparatus shown in FIG. 4.

FIGS. 4, 5, and 6 are explanatory views of the second embodiment of the present invention, and the second embodiment will be described below with reference to these drawings. FIG. 6 is an explanatory view of the principle of the second embodiment of the present invention. FIG. 6 illustrates a display pixel portion 3 of display elements of, e.g., a liquid crystal display, plasma display, fluorescent display tube, CRT, or the like, although it does not illustrate a glass substrate such as a faceplate. A lenticular lens 5 consisting of a transparent resin such as an acrylic resin or glass is arranged on the front surface of the display pixel portion 3, and cylindrical surfaces extend in a direction perpendicular to the plane of the drawing of FIG. 6. As has been described in the prior art, an image on the display pixel portion 3 is optically separated by the lenticular lens 5, so that an image for the right eye (black portions of a displayed image) and an image for the left eye (white portions of the displayed image) are incident on the right and left eyes of an observer. A known variable apex angle prism 9 disclosed in Japanese Laid-Open Patent Application No. 5-142500 is arranged on the front surface of the lenticular lens. The variable apex angle prism is constituted by transparent glass plates 10 and 11, a transparent member 12 which is filled between the two glass plates and consists of a transparent liquid such as silicone oil or a soft elastic member such as silicone rubber, and a bellows 13 which seals the transparent member 12 therein and consists of, e.g., polyethylene. The front glass plate 10 is rotatable about the center 14 of rotation, and can freely change the apex angle θ of the variable apex angle prism. The variable apex angle prism can deflect light rays in accordance with its apex angle, and if the refractive index of the transparent member 12 is represented by n, the apex angle is represented by θ, and the deflection angle between an incident light ray and an exit light ray is represented by δ, the deflection angle δ is expressed as follows in a range with a small apex angle:

$$\delta = (n-1)\theta$$

When silicone oil is used as the transparent member 12, since n is about 1.4, the deflection angle δ is 4° when the apex angle θ is 10°.

FIG. 6 illustrates the positions of right and left eyes $E_R$ and $E_L$, and a stereoscopic view area 6a when an observer is located at the reference position on the central line of the stereoscopic display. When the observer moves from the reference position, and his or her right and left eyes are located at positions $E_R'$ and $E_L'$, as shown in FIG. 6, the apex angle θ of the variable apex angle prism is changed to follow the shift, thereby setting a stereoscopic view area 6b. When the apex angle of the variable apex angle prism is θ, light rays are deflected, as shown in FIG. 6, and are rotated through the deflection angle δ as in the stereoscopic view area 6b. For example, when the reference position of the observer is separated from the display by about 50 cm, if it is assumed that the deflection angle δ of the variable apex angle prism can follow the observer within a range of ±4° (corresponding to an apex angle of ±10°), the stereoscopic view area horizontally moves by about ±35 mm. Thus, the stereoscopic view area of the observer falls within a range of ±32.5 mm (the standard distance between the two eyes is assumed to be 65 mm) on the right and left sides of the central reference position when the stereoscopic display does not follow the movement of the observer, but can be set to be twice or more, i.e., ±67.5 mm by changing the angle to follow the movement of the observer.

FIG. 4 is an explanatory view of the detailed arrangement of the apparatus of this embodiment. The variable apex angle prism 9 is arranged on the front surface of a liquid crystal display 1 provided with the lenticular lens 5, and an observer observes an image via the variable apex angle prism 9. The rear glass plate 11 of the variable apex angle prism 9 is fixed in position, and the front glass plate 10 is pivotal about a rotation shaft 15 supported by bearings (not shown). A rotation drive mechanism 21 is arranged on an end portion member 16 of the front glass plate 10. The rotation drive mechanism 21 comprises a linear actuator 17 using an electromagnetic coil, and a restoration spring 18 for pressing the member 16 against the linear actuator. An angle detection sensor 23 comprises an encoder scale 19 arranged on a portion of the member 16, and a photosensor 20. Head position detection sensors 22 comprise ultrasonic sensors. The sensors 22 are arranged on the right and left sides of the display, and respectively detect the distances to the head portion of an observer on the basis of the reflection times of ultrasonic waves. A detection circuit (not shown) calculates the horizontal position, parallel to the display, of the head portion of the observer.

FIG. 5 is a block diagram showing the arrangement of a control system of the apparatus of this embodiment. A CPU 34 reads the head position of the observer, which is detected by the head position detection sensors 22 and a detection circuit 32, and calculates the target apex angle, at which the optical axis of the variable apex angle prism is directed toward the central portion of the head portion of the observer, on the basis of the read signal. At the same time, the CPU 34 reads the current apex angle of the variable apex angle prism 9 via the angle detection sensor 23 and a detection circuit 33, compares the current apex angle with the target apex angle, and controls the variable apex angle prism 9 via a drive circuit 31 and the angle changeable actuator 17, so that the difference between the two angles becomes 0. With this control, the observer is always located at substantially the center of the stereoscopic view area within the moving range of the variable apex angle prism, thus widening the stereoscopic view area. In this embodiment, the head position detection sensors comprise ultrasonic sensors, but may comprise distance sensors using infrared rays. Alternatively, an image of the head portion of the observer may be picked up using a video camera, and the picked-up image may be subjected to image processing to obtain the head position or the positions of the two eyes.

In the description of this embodiment, the glass plate, on the observer side, of the variable apex angle prism is movable. On the contrary, the glass plate, on the display side, of the prism may be movable, and the glass plate, on the observer side, of the prism may be fixed in position, thus providing the same effect as in the above embodiment.

The third embodiment of the present invention will be described below with reference to FIGS. 7 to 10.

Figure 7:
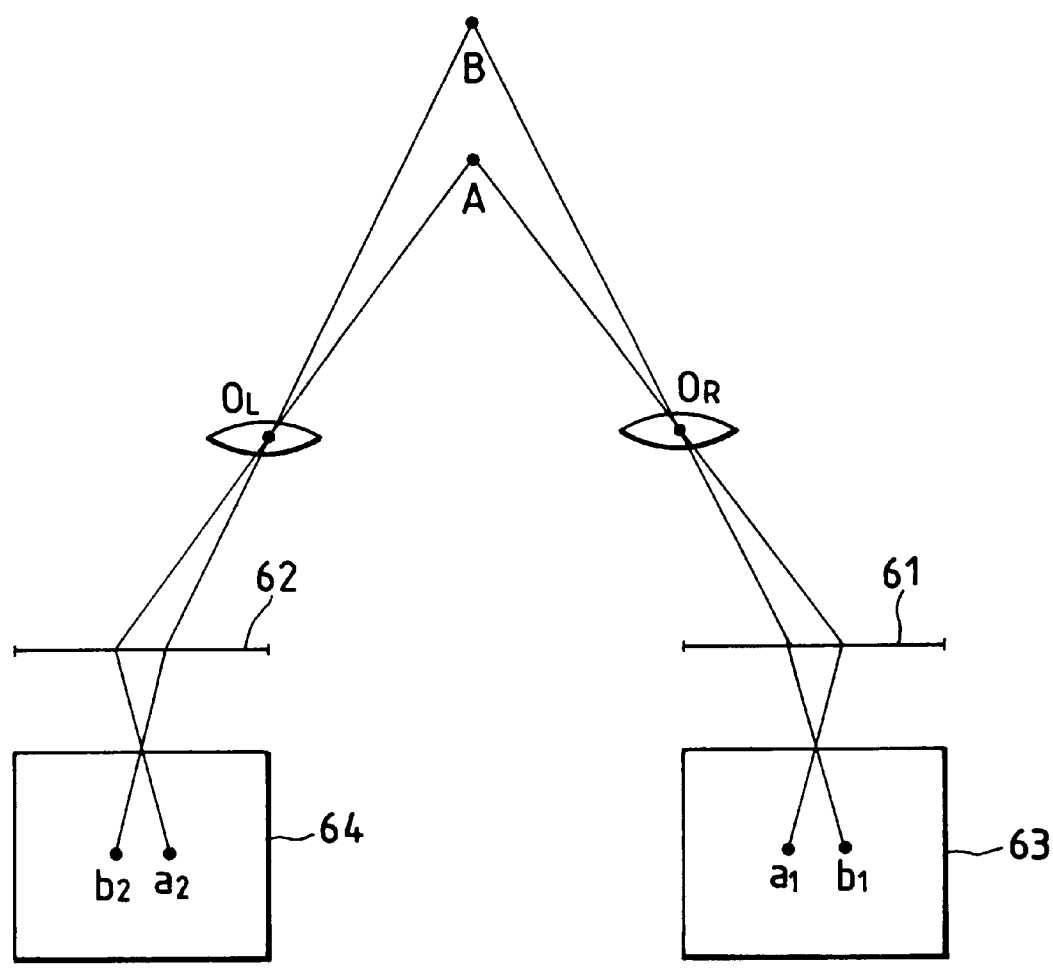
FIG. 7 is a view for explaining the principle of stereoscopic view.

In general, the depth feeling of an image on a stereoscopic display using a lenticular lens is generated by the difference between images for the right and left eyes, which are observed by the two eyes of an observer, and the observer feels the depth by the difference between the horizontal positions of object images for the right and left eyes (to be referred to as right and left images hereinafter) in images. FIG. 7 shows the positional relationship between the right and left images obtained when images of objects A and B with different depths are picked up by cameras. Photographing lenses $O_R$ and $O_L$ respectively form images on image pickup surfaces 61 and 62, and when the formed images are inverted, right and left images 63 and 64 are obtained. In these images, the horizontal positions of the images of the objects A and B replace each other. FIGS. 8A and 8B show the views of the observer depending on the positional relationship, in the horizontal direction, of the right and left images when the obtained right and left images are displayed on a stereoscopic display using a lenticular lens.

FIG. 8A shows a case wherein right and left images a1 and b1 of the object A are caused to coincide with each other on the display screen. In this case, the object A seems to be located on the screen, and the object B seems to be located behind the object A in the screen since it has a parallax on the screen. FIG. 8B shows a case wherein the right and left images b1 and b2 of the object B are caused to coincide with each other. In this case, the object B seems to be located on the screen, and the object A seems to be located in front of the object B in the screen. More specifically, when the right and left images are shifted in the horizontal direction on the display screen, an object to be observed can be selected, so that its right and left images coincide with each other on the display screen.

When an observer actually observes a stereoscopic display, when the right and left images of a certain object have a parallax larger than a predetermined value on the screen, the observer can hardly recognize the double images as one image, and cannot clearly observe the object image since the image is blurred. In this embodiment, when an image is displayed on the stereoscopic display, the visual axis position, on the display screen, of the observer is detected, and the right and left images of an object at the detected visual axis position are controlled to be moved in the horizontal direction, so that they coincide with each other on the screen.

Figure 9A:
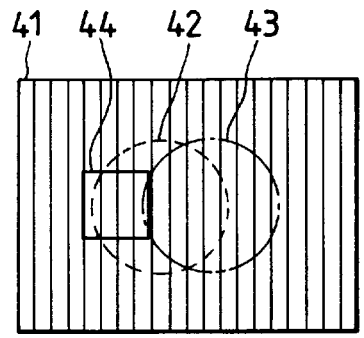
FIG. 9A is a view for explaining images for the right and left eyes on a stereoscopic display screen.
Figure 9B:
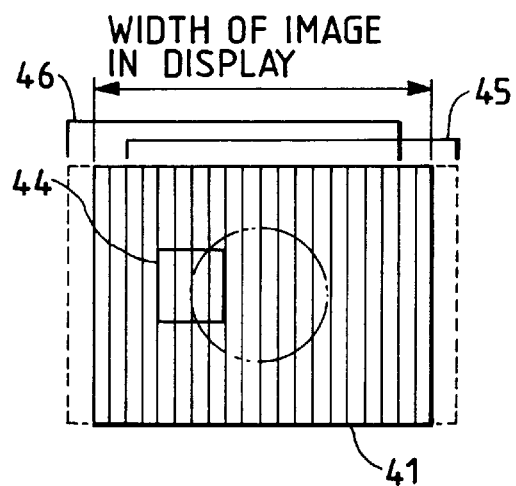
FIG. 9B is a view showing a case wherein a clear object image is obtained by moving images for the right and left eyes to the right and left, respectively, on the stereoscopic display screen.
Figure 9C:
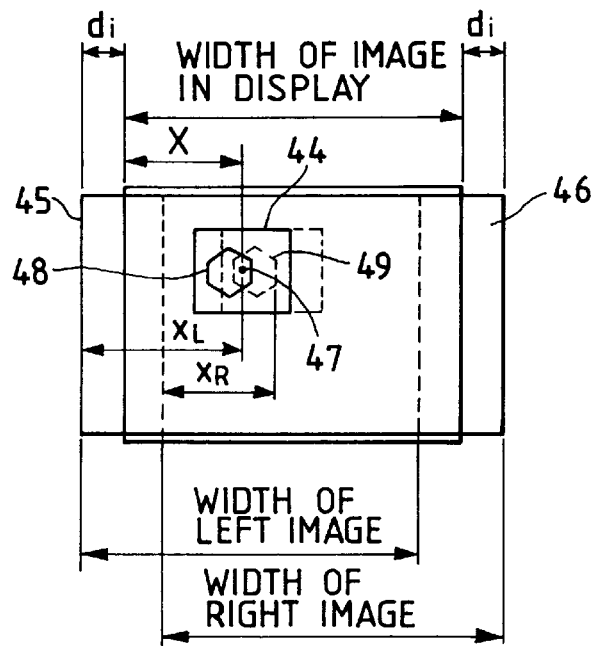
FIG. 9C is an explanatory view of a method of calculating the moving amount upon movement of images for the right and left eyes.
Figure 10:
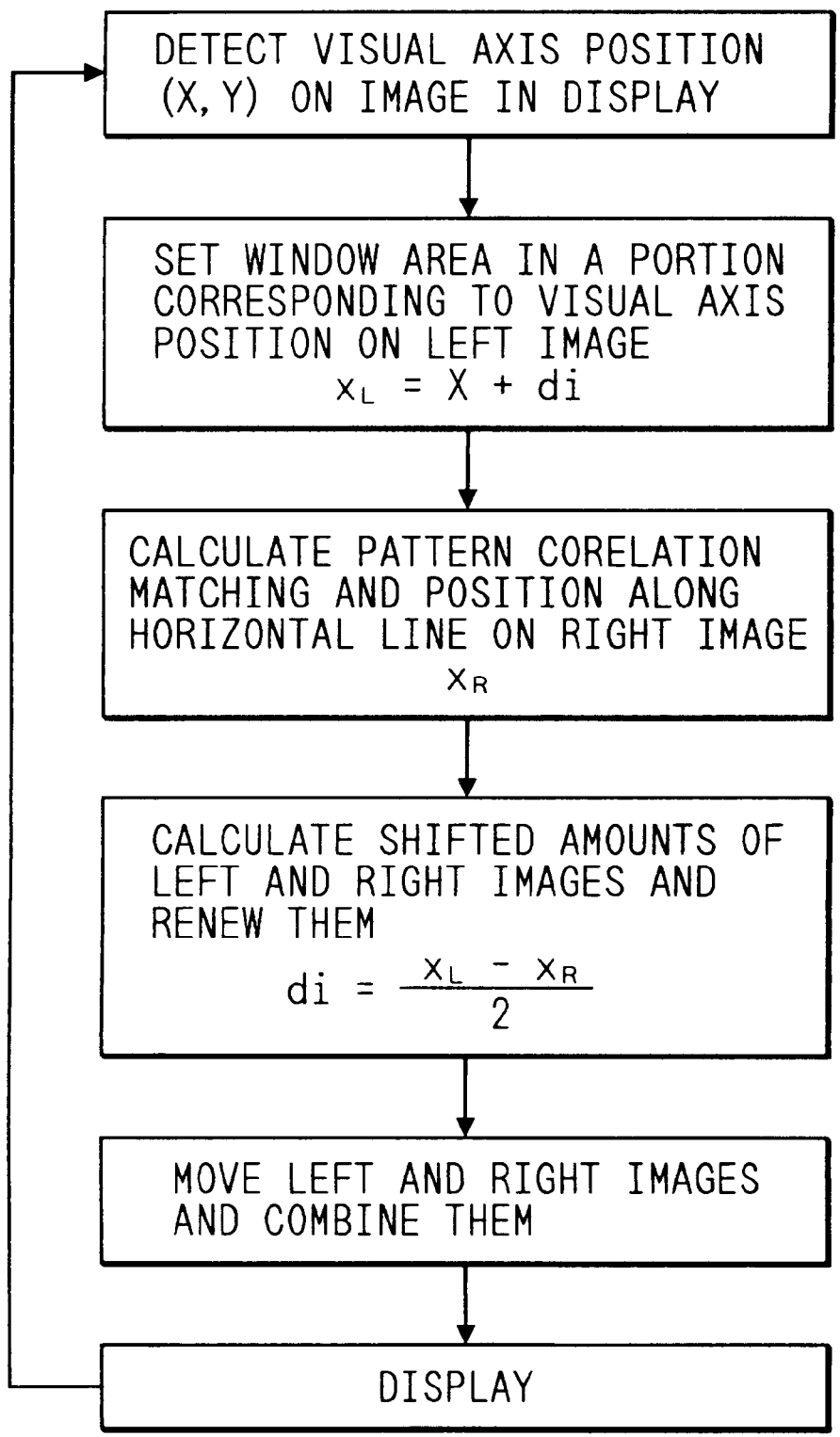
FIG. 10 is an explanatory view of an image control method of the present invention.
Figure 11:
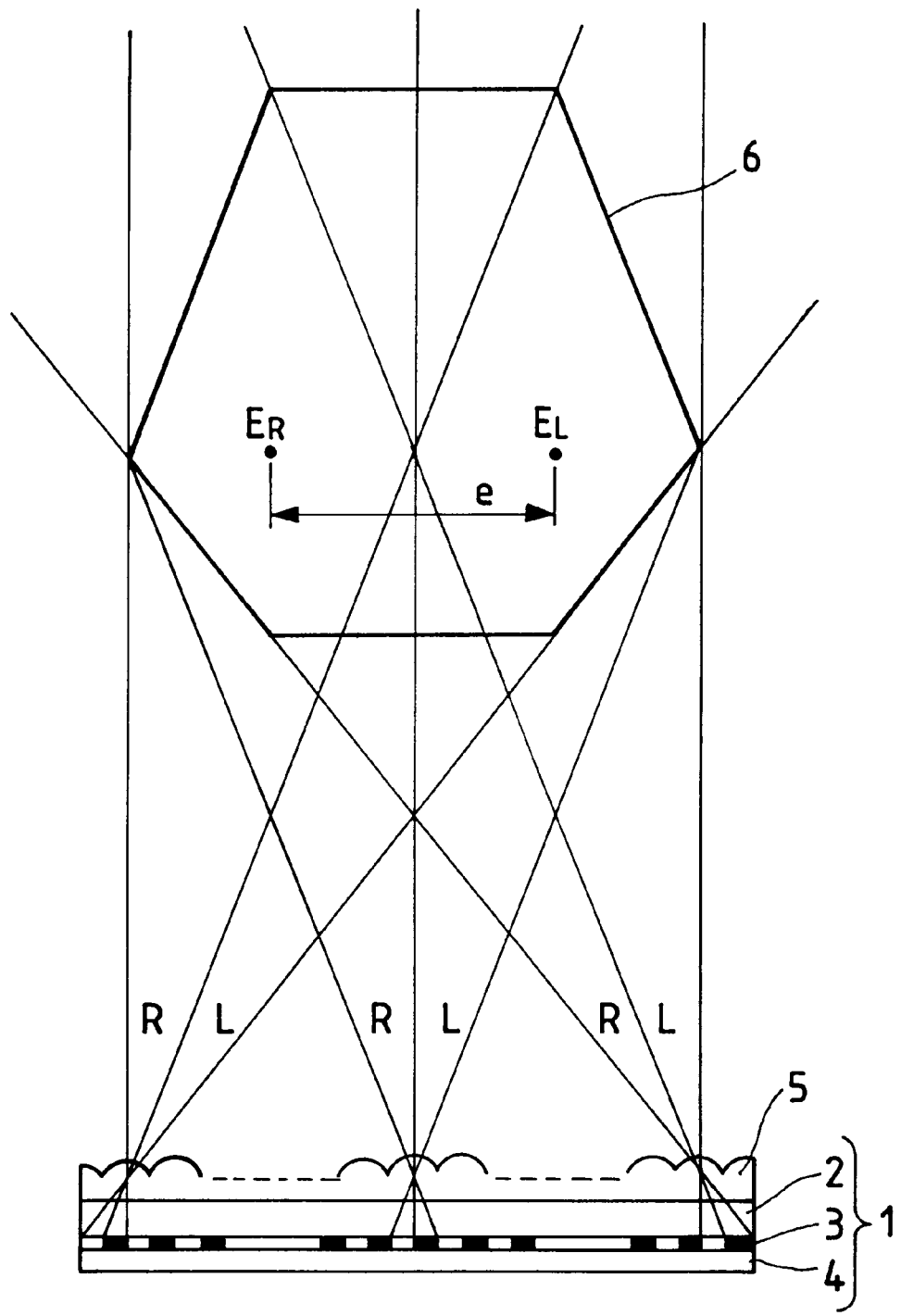
FIG. 11 is an explanatory view of a conventional stereoscopic display using a lenticular lens.

FIGS. 9A, 9B, and 9C are explanatory views of the principle of screen control of a stereoscopic display according to the third embodiment of the present invention, and FIG. 10 is a flow chart for explaining the flow of the screen control.

FIG. 9A illustrates a lenticular lens type stereoscopic display screen 41, an object image 42 in a left image 45, and an object image 43 in a right image 46. These object images are separately observed by the right and left eyes by a lenticular lens, thus achieving a stereoscopic view. An area 44 has the visual axis position where an observer gazes as the center. As shown in FIG. 9B, when the right and left images 46 and 45 of an object image at the visual axis position in the area 44 are respectively moved to the left and right with respect to the stereoscopic display screen 41 to coincide with each other, the object image is observed more clearly.

FIG. 9C is an explanatory view of the method of calculating actual moving amounts, and FIG. 10 is a flow chart of the screen control. The screen control upon movement of the visual axis to the next visual axis position from a state wherein the right and left images are shifted from each other by $d_i$, as shown in FIG. 9C, will be explained below. When the visual axis moves to a regular hexagonal object 48 (on the left image 45) and a regular hexagonal object 49 (on the right image 46), a visual axis detection sensor detects an average stay position 47 of the visual axis (i.e., the gazing point) of an observer, i.e., the coordinate position (X, Y) on the display screen, and a window area 44 whose size is optimized based on the detected position is set in advance. Upon calculation of a horizontal coordinate position $X_L$, with reference to the left image 45, of the visual axis stay position 47, $X_L = X + d_i$. In order to search for an image area with the highest correlation on the right image with reference to an image in the window area 44 of the left image, and to calculate its position $X_R$ (the x-coordinate position with reference to the right image 46), the right image is scanned along the same horizontal line to calculate an image correlation.

As a method of the image correlation calculation, a method of calculating a position where the square sum of errors of the density values in units of corresponding pixels is minimized is used. Upon calculation of a new shifted amount $d_i$ of the right and left images from the horizontal coordinate position $X_L$ of the left image and the horizontal coordinate position $X_R$ of the left image at the visual axis stay position, $d_i = (X_L - X_R)/2$. The right and left images are moved by the shifted amount $d_i$ in the horizontal direction with respect to the display screen, and are renewed, so that right and left image portions alternately align in stripe patterns in correspondence with the lenticular lens method.

FIG. 10 shows the flow of the above-mentioned image control. Every time the stay position of the visual axis changes, screen control is performed to cause the right and left images of a new object image at that position to coincide with each other.

When the right and left images are shifted by the shifted amount $d_i$, since only one of the right and left images is displayed on the right or left end portion on the display screen, the same stripe portion of the one image is arranged at the other image position upon a display of the corresponding portion in one pitch of the lenticular lens, so that the same image portion comes through to the right and left eyes. With this control, although a stereoscopic view of this portion is not attained, since such a portion is located at one of the two end portions of the display screen, it does not stand out. When the width of each of the right and left images is sufficiently larger than the width of the display screen, such processing is not required.

The above-mentioned image control may be attained either in a software manner using a CPU or in a hardware manner using a special-purpose image processing circuit. Upon detection of the visual axis position, a method in which an image of the head portion of an observer is picked up using a video camera, the images of the two eye portions are extracted by image processing, the patterns of the pupil and sclera portions are recognized, and the interval between the pupils of the two eyes and their horizontal positions are processed to correspond to the visual axis position may be used. Alternatively, a visual axis detection method as a combination of the head position detection method described in the first embodiment, and a method in which LEDs for irradiating infrared rays onto the eyeballs and CCD cameras for detecting light reflected by the eyeballs are arranged on the frame of spectacles, and the angles of the eyeballs are calculated by utilizing Purkinje images so as to detect the visual axis position, may be used. As the other embodiment regarding a visual axis detection, there is U.S. Pat. No. 4,950,069.

As described above, in the stereoscopic display apparatus according to the present invention, since the stereoscopic view area is widened by integrally pivoting the lenticular lens and the display pixel portion toward an observer, a stereoscopic display apparatus free from the conventional problems can be realized.

In the present invention, since a portion to be moved is only a variable apex angle prism device, most part of the design of the conventional stereoscopic display apparatus need not be changed, and the stereoscopic view area can be widened by attaching the variable apex angle prism device to the conventional stereoscopic display apparatus.

According to the image control method of the present invention, a stereoscopic display method which can prevent double images from being observed can be realized.

What is claimed is:

1. A display apparatus comprising:

image display means for displaying an image;

a lenticular lens arranged on a front surface of said image display means; and control means for controlling a direction of light of said image display means, which emerges from said lenticular lens, wherein said control means rotates said lenticular lens and said image display means to have a longitudinal direction of said lenticular lens as a rotation axis.

2. A display apparatus comprising:

image display means for displaying an image;

a lenticular lens arranged on a front surface of said image display means;

control means for controlling a direction of light of said image display means, which emerges from said lenticular lens; and variable apex angle prism means arranged in front of said lenticular lens, and wherein said control means controls an apex angle of said variable apex angle prism means.

3. An apparatus according to claim 1, further comprising position detection means for detecting a position of an observer who observers said image display means, and wherein said control means rotates said lenticular lens and said image display means to have the longitudinal direction of said lenticular lens as the rotation axis on the basis of said position detection means.

4. An apparatus according to claim 2, further comprising position detection means for detecting a position of an observer who observers said image display means, and wherein said control means controls the apex angle of said variable apex angle prism means on the basis of said position detection means.

5. A display apparatus comprising:

image display means for displaying an image;

a lenticular lens arranged on a front surface of said image display means; and detection means for detecting a gazing point of an observer on a screen of said image display means;

control means for controlling an image position of at least one of the images for right and left eyes on said image display means so that the images for the right and left eyes become close to each other at the gazing point.

6. A display apparatus according to claim 5, wherein said control means controls the image position based on the output of said detection means.

7. A stereoscopic display apparatus comprising:

displaying means for displaying an image for a left eye of an observer and an image for a right eye of the observer;

an optical member for directing light of the image for the left eye toward the left eye and directing light of the image for the right eye toward the right eye;

means for rotating said displaying means and said optical member about a predetermined axis; and detecting means for detecting a position of the observer, wherein said displaying means and said optical member are rotated about the predetermined axis based on an output detection of said detecting means.

8. A stereoscopic display apparatus comprising:

displaying means for displaying an image for a left eye of an observer and an image for a right eye of the observer;

an optical member for directing light of the image for the left eye toward the left eye and directing light of the image for the right eye toward the right eye;

a variable apex angle prism disposed in front of said optical member; and detecting means for detecting a position of the observer, wherein an apex angle of said variable apex angle prism is changed based on an output detection of said detecting means.

* * * * *

UNITED STATES PATENT AND TRADEMARK OFFICE
CERTIFICATE OF CORRECTION

PATENT NO. : 5,966,167

DATED : October 12, 1999

INVENTOR(S): HIROYASU NOSE, ET AL.

It is certified that error appears in the above-identified patent and that said Letters Patent is hereby corrected as shown below:

[56] REFERENCES CITED:

FOREIGN PATENT DOCUMENTS, "244995   should   --2-44995
250145   read   2-50145
5142500"         5-142500--.

SHEET 7:

FIG. 10, "CORELATION" should read --CORRELATION--.

COLUMN 9:

Line 34, "part" should read --parts--.

COLUMN 10:

Line 6, "observers" should read --observes--.
Line 13, "observers" should read --observes--.

Signed and Sealed this

Thirty-first Day of October, 2000

Attest:

Q. TODD DICKINSON

*Attesting Officer*     *Director of Patents and Trademarks*